United States Patent
Ikeda et al.

(10) Patent No.: US 8,947,747 B2
(45) Date of Patent: Feb. 3, 2015

(54) ERECTING EQUAL-MAGNIFICATION LENS ARRAY PLATE AND IMAGE READING DEVICE

(75) Inventors: Makoto Ikeda, Minato-ku (JP); Hiroaki Kato, Minato-ku (JP)

(73) Assignee: Nippon Sheet Glass Company, Limited, Tokyo (JP)

( * ) Notice: Subject to any disclaimer, the term of this patent is extended or adjusted under 35 U.S.C. 154(b) by 1051 days.

(21) Appl. No.: 13/010,484

(22) Filed: Jan. 20, 2011

(65) Prior Publication Data

US 2011/0176183 A1  Jul. 21, 2011

(30) Foreign Application Priority Data

Jan. 21, 2010 (JP) .................................. 2010-010618

(51) Int. Cl.
*H04N 1/04* (2006.01)
*H04N 1/40* (2006.01)
*G02B 27/00* (2006.01)
*G02B 27/02* (2006.01)
*G02B 27/12* (2006.01)
*H04N 1/031* (2006.01)
*H04N 1/028* (2006.01)
*G02B 3/00* (2006.01)

(52) U.S. Cl.
CPC ............ *H04N 1/0311* (2013.01); *H04N 1/0315* (2013.01); *H04N 1/02845* (2013.01); *H04N 1/02895* (2013.01); *G02B 3/0062* (2013.01); *H04N 1/0312* (2013.01)
USPC ............ 358/474; 358/471; 358/505; 359/477; 359/601; 359/622

(58) Field of Classification Search
CPC .......................................... H04N 2201/03166
See application file for complete search history.

(56) References Cited

U.S. PATENT DOCUMENTS

| 5,331,146 | A | * | 7/1994 | Tanimizu ................... 250/208.1 |
| 5,444,520 | A | * | 8/1995 | Murano ....................... 399/221 |
| 5,570,204 | A | * | 10/1996 | Kumashiro ................... 358/471 |
| 5,604,606 | A | * | 2/1997 | Miyashita et al. ............ 358/474 |
| 5,768,023 | A | * | 6/1998 | Sawaki et al. ................ 359/622 |
| 6,707,613 | B2 | * | 3/2004 | Fujimoto et al. ............. 359/622 |
| 2009/0021837 | A1 | * | 1/2009 | Toyoda et al. ................ 359/619 |
| 2009/0052044 | A1 | * | 2/2009 | Nagata ......................... 359/622 |
| 2009/0141362 | A1 | * | 6/2009 | Shimmo et al. ............... 359/622 |
| 2010/0027129 | A1 | * | 2/2010 | Sato et al. .................... 359/622 |
| 2010/0067070 | A1 | * | 3/2010 | Mamada et al. .............. 358/475 |
| 2010/0128353 | A1 | * | 5/2010 | Nagata et al. ................. 359/619 |

FOREIGN PATENT DOCUMENTS

JP    2009-069801 A    4/2009

* cited by examiner

*Primary Examiner* — Beniyam Menberu
(74) *Attorney, Agent, or Firm* — Sughrue Mion, PLLC

(57) ABSTRACT

An image reading device includes: a document table on which a document G is placed; a line light source configured to illuminate the document G; an erecting equal-magnification lens array plate configured to receive light reflected from the document G and form an erect equal-magnification image on a predetermined image plane; and a line image sensor configured to receive the erect equal-magnification image formed by the erecting equal-magnification lens array plate. The erecting equal-magnification lens array plate includes: first and second lens array plates formed with a plurality of lenses on both sides thereof; a first shielding member provided on the first outer side surface of the first lens array plate; and a light-shielding wall provided upright on the top surface of the first light-shielding member and configured to shield light reflected by the document table.

8 Claims, 13 Drawing Sheets

ERECTING EQUAL-MAGNIFICATION LENS ARRAY PLATE AND IMAGE READING DEVICE

BACKGROUND OF THE INVENTION

1. Field of the Invention

The present invention relates to erecting equal-magnification lens array plates used in image reading devices, and to image forming devices using the erecting equal-magnification lens array plate.

2. Description of the Related Art

Some image reading devices such as scanners are known to use erecting equal-magnification optics. Erecting equal-magnification optics are capable of reducing the size of devices better than reduction optics. In the case of image reading devices, an erecting equal-magnification optical system comprises a line light source, an erecting equal-magnification lens array, and a line image sensor.

A rod lens array capable of forming an erect equal-magnification image is used as an erecting equal-magnification lens array in an erecting equal-magnification optical system. Normally, a rod lens array comprises an arrangement of rod lenses in the longitudinal direction (main scanning direction of the image reading device) of the lens array. By increasing the number of columns of rod lenses, the proportion of light transmitted is improved and unevenness in the amount of light transmitted is reduced. Due to price concerns, it is common to use one or two columns of rod lenses in a rod.

Meanwhile, an erecting equal-magnification lens array plate could be formed as a stack of a plurality of transparent lens array plates built such that the light axes of individual convex lenses are aligned, where each transparent lens array plate includes a systematic arrangement of micro-convex lenses on one or both surfaces of the plate. Since an erecting equal-magnification lens array plate such as this can be formed by, for example, injection molding, erecting equal-magnification lens arrays in a plurality of columns can be manufactured at a relatively low cost.

An erecting equal-magnification lens array plate lacks a wall for beam separation between adjacent lenses. Therefore, there is a problem of stray light wherein a light beam diagonally incident on an erecting equal-magnification lens array plate travels diagonally inside the plate and enters an adjacent convex lens, creating noise (also referred to as ghost) as it leaves the plate.

There is known an erecting equal-magnification lens array plate in which a light shielding member for removing stray light not contributing to imaging is formed on the surface of the plate (see, for example, patent document No. 1).

PRIOR ART DOCUMENT

Patent Document

[Patent Document No. 1] JP2009-069801

In an image reading device using an erecting equal-magnification lens array plate, a majority of the beams exiting the line light source and transmitted through the document table are reflected by the surface of the document placed on the document table before reaching the line image sensor due to the imaging action of the erecting equal-magnification lens array plate. However, some beams incident on the document table are reflected by the boundary surface of the document table. Much of the reflected light is shielded by a light shielding member provided on the erecting equal-magnification lens array plate, but a small portion of the light enters the lens, reaching the line image sensor.

The light reflected by the boundary surface of the document table before reaching the line image sensor is relatively less intense and hardly shows in the image formed on the image plane if the document is white. If the document is in black or the document is not placed, however, the light shows as periodically bright and dark linear noise that depends on the periodical arrangement of the lenses of the erecting equal-magnification lens array plate, with the result that the image quality may be lowered.

SUMMARY OF THE INVENTION

The present invention addresses the issue and a purpose thereof is to provide an erecting equal-magnification lens array plate and an image reading device capable of producing a high-quality image in which bright and dark linear noise is reduced.

The erecting equal-magnification lens array plate configured to receive light emitted by a line light source and reflected from a document placed on a document table, and form an erect equal-magnification image on a light receiving surface of a line image sensor. The equal-magnification lens array plate comprises: a first lens array plate formed with a plurality of lenses on both sides thereof and arranged such that one of the surfaces is opposite to the document table; a second lens array plate formed with a plurality of lenses on both sides thereof and arranged such that one of the surfaces is opposite to the first lens array plate and the other surface is opposite to the line image sensor; a shielding member provided with a plurality of through holes corresponding to lenses formed on the surface of the first lens array plate and provided on said surface of the first lens array plate such that the through holes are located directly opposite to the corresponding lenses; and a light-shielding wall provided upright on a surface of the light-shielding member facing the document table and configured to shield light reflected by the document table.

According to the embodiment, the light-shielding wall provided upright on the surface of the light-shielding member facing the document shields light reflected by the document table so that a high-quality image in which bright and dark linear noise is reduced can be formed.

The light-shielding wall may be provided upright on the surface of the light-shielding member facing the document table and at a region closer to the line light source than the through holes. In this case, bright and dark linear noise can be suitably reduced.

The light-shielding member may be provided such that the surface thereof facing the document table is closer to the document table than a light emitting surface of the line light source. This reduces light directly incident on the lenses from the line light source so that an image with reduced flare noise can be formed.

The light-shielding wall may be formed outside an angle of view of the lenses formed on the surface of the first lens array plate and outside a light path of light reaching a predetermined image reading portion of the document table from the line light source. In this case, bright and dark linear noise can be eliminated without shielding light that contributes to imaging.

Another embodiment of the present invention is an image reading device. The image reading device comprises: a document table on which a document is placed; a line light source configured to illuminate the document; an erecting equal-magnification lens array plate configured to receive light reflected from the document and form an erect equal-magnification image on a predetermined image plane; and a line image sensor configured to receive the erect equal-magnification image formed by the erecting equal-magnification lens array plate. The erecting equal-magnification lens array plate comprises: a first lens array plate formed with a plurality of lenses on both sides thereof and arranged such that one of the surfaces is opposite to the document table; a second lens array plate formed with a plurality of lenses on both sides thereof and arranged such that one of the surfaces is opposite to the first lens array plate and the other surface is opposite to the line image sensor; a shielding member provided with a plurality of through holes corresponding to lenses formed on the surface of the first lens array plate and provided on said surface of the first lens array plate such that the through holes are located directly opposite to the corresponding lenses; and a light-shielding wall provided upright on a surface of the light-shielding member facing the document table and configured to shield light reflected by the document table.

According to the embodiment, the light-shielding wall provided upright on the surface of the light-shielding member facing the document shields light reflected by the document table so that a high-quality image in which bright and dark linear noise is reduced can be formed.

The light-shielding wall may be provided upright on the surface of the light-shielding member facing the document table and at a region closer to the line light source than the through holes. In this case, bright and dark linear noise can be suitably reduced.

The light-shielding member may be provided such that the surface thereof facing the document table is closer to the document table than a light emitting surface of the line light source. This reduces light directly incident on the lenses from the line light source so that an image with reduced flare noise can be formed.

The light-shielding wall may be formed outside an angle of view of the lenses formed on the surface of the first lens array plate and outside a light path of light reaching a predetermined image reading portion of the document table from the line light source. In this case, bright and dark linear noise can be eliminated without shielding light that contributes to imaging.

Optional combinations of the aforementioned constituting elements, and implementations of the invention in the form of methods, apparatuses, and systems may also be practiced as additional modes of the present invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

The invention will now be described by reference to the preferred embodiments. This does not intend to limit the scope of the present invention, but to exemplify the invention.

Figure 1:
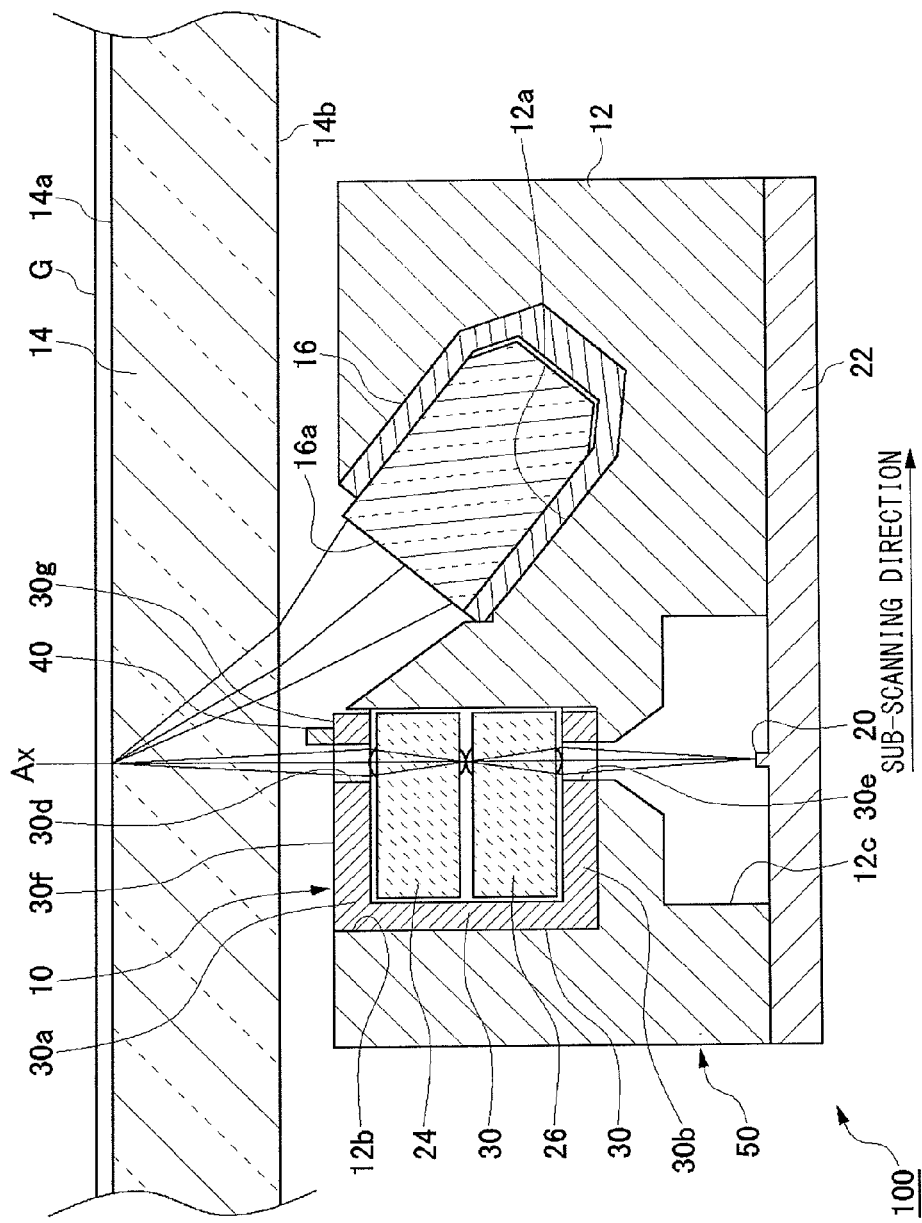
FIG. 1 shows a cross section of an image reading device according to an embodiment of the present invention.

FIG. 1 shows a cross section of an image reading device 100 according to an embodiment of the present invention. As shown in FIG. 1, the image reading device 100 comprises a document table 14 on which a document G is placed, an optical scanning unit 50, a driving mechanism (not shown) for driving the optical scanning unit 50, and an image processing unit (not shown) for processing data read by the optical scanning unit 50.

The document table 14 is a transparent glass plate and is supported by a housing (not shown) of the image reading device 100. A document G is placed on a top surface 14a of the document table 14. In the specification, the direction in which the document G is located relative to the document table 14 will basically be referred to as the upward direction.

The optical scanning unit 50 comprises a line light source 16 for illuminating a document G placed on the document table 14, an erecting equal-magnification lens array plate 10 for receiving light reflected from the document G to create an erect equal-magnification image on a predetermined image plane, a line image sensor (photoelectric transducer) 20 for receiving the erect equal-magnification image formed by the erecting equal-magnification lens array plate 10, and a frame 12 for securing the line light source 16, the erecting equal-magnification lens array plate 10, and the line image sensor 20.

A first recess 12a and a second recess 12b are formed in the upper part of the frame 12 and a third recess 12c is formed in the lower part.

The line light source 16 is fixed inside the first recess 12a diagonally with respect to the document table 14. The light exiting the line light source 16 is diagonally enters the document table 14 via the bottom surface 14b of the document table 14, travels inside the document table 14, and is incident on the neighborhood of the intersection between the light axis Ax of the erecting equal-magnification lens array plate 10 and the top surface 14a of the document table 14.

The second recess 12b is formed at a position adjacent to the first recess 12a, and the erecting equal-magnification lens array plate 10 is secured in the second recess 12b.

The third recess 12c is formed below the second recess 12b, and a substrate 22 provided with the line image sensor 20 is fitted in the third recess 12c.

The erecting equal-magnification lens array plate 10 comprises a stack of a first lens array plate 24 and a second lens array plate 26 such that pairs of corresponding lenses form coaxial lens systems, where each lens array plate is formed with a plurality of convex lenses on both planes of the plate. The first lens array plate 24 and the second lens array plate 26 are held by a holder 30 in a stacked state. The erecting equal-magnification lens array plate 10 is installed in the image reading device 100 such that the longitudinal direction thereof is aligned with the main scanning direction and the lateral direction thereof is aligned with the sub-scanning direction. The erecting equal-magnification lens array plate 10 is configured to receive substantially straight light reflected from the document G located above and form an erect equal-magnification image on an image plane located below, i.e., a light-receiving surface of the line image sensor 20.

In the image reading device 100, the light exiting the line light source 16 irradiates the document G through the document table 14. The document G is read by allowing the line image sensor 20 to detect the light reflected from the document G via the erecting equal-magnification lens array plate 10. A desired area on the document G is read by scanning the optical scanning unit 50 in the sub-scanning direction with respect to the document table 14.

Figure 2:
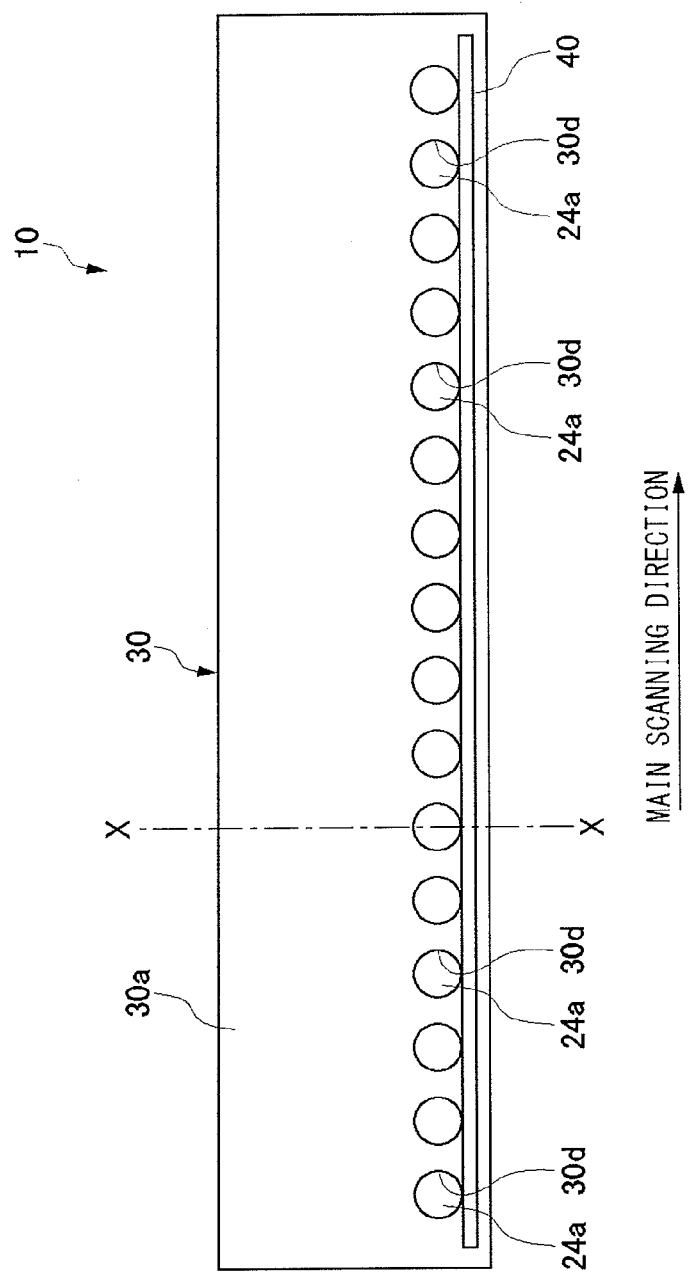
FIG. 2 is a top view of the erecting equal-magnification lens array plate according to the embodiment.
Figure 3:
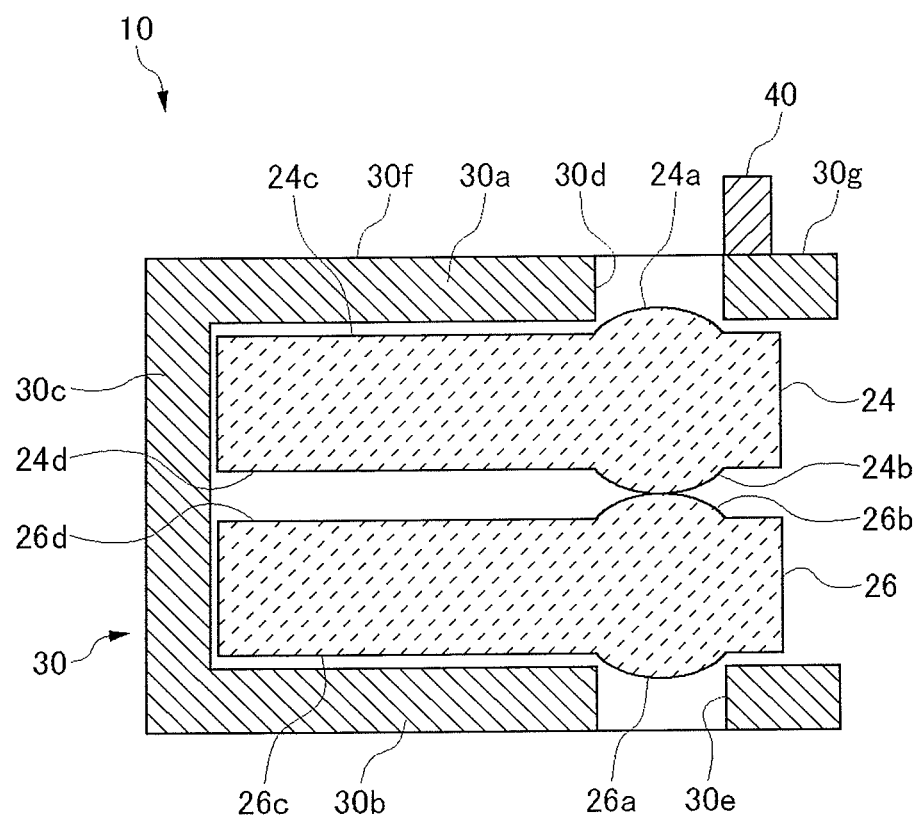
FIG. 3 shows an X-X cross section of the erecting equal-magnification lens array plate shown in FIG. 2.

FIG. 2 is a top view of the erecting equal-magnification lens array plate 10 according to the embodiment. FIG. 2 shows the erecting equal-magnification lens array plate 10 viewed from the document G. FIG. 3 shows an X-X cross section of the erecting equal-magnification lens array plate shown in FIG. 2.

As shown in FIGS. 2 and 3, the erecting equal-magnification lens array plate 10 is provided with the first lens array plate 24, the second lens array plate 26, and the holder 30.

According to the embodiment, the first lens array plate 24 and the second lens array plate 26 have the same shape. The first lens array plate 24 and the second lens array plate 26 are rectangular in shape. A plurality of convex lenses are arranged on both surfaces of the plate. In other words, a plurality of first outer lenses 24a are systematically arranged on a first outer side surface 24c of the first lens array plate 24, and a plurality of first inner lenses 24b are systematically arranged on a first inner side surface 24d of the lens array plate 24. A plurality of second inner lenses 26b are systematically arranged on a second inner side surface 26d of the second lens array plate 26, and a plurality of second outer lenses 26a are systematically arranged on a second outer side surface 26c of the lens array plate 26.

According to the embodiment, the first outer lens 24a, the first inner lens 24b, the second outer lens 26a, and the second inner lens 26b have the same shape. The lenses are arranged in a line at the same pitch in the longitudinal direction of the lens array plate. Thus, when the first lens array plate 24 and the second lens array plate 26 are placed such that the first inner side surface 24d and the second inner side surface 26d are opposite to each other, the light axes of the four corresponding lenses are aligned. According to the embodiment, it is assumed that the first outer lens 24a, the first inner lens 24b, the second outer lens 26a, and the second inner lens 26b are spherical in shape. Alternatively, the lenses may have aspherical shapes.

The first lens array plate 24 and the second lens array plate 26 are formed by injection molding. Preferably, each of the first lens array plate 24 and the second lens array plate 26 is formed of a material amenable to injection molding, having high light transmittance in a desired wavelength range, and having low water absorbability. Desired materials include cycloolefin resins, olefin resins, norbornene resins, and polycarbonate.

The holder 30 supports a stack of the first lens array plate 24 and the second lens array plate 26 such that the first inner side surface 24d and the second inner side surface 26d are opposite to each other. As shown in FIGS. 2 and 3, the holder 30 is provided with a first light shielding member 30a, a second light shielding member 30b, and a support part 30c.

The first light shielding member 30a and the second light shielding member 30b are rectangular plate members having substantially the same size. The first light shielding member 30a and the second light shielding member 30b are supported by the support part 30c provided at the left lateral end such that the members are parallel and create predetermined space therebetween. In the holder 30, the space between the first light shielding member 30a and the second light shielding member 30b is created so that the first lens array plate 24 and the second lens array plate 26 can be inserted into the space.

A plurality of first through holes 30d corresponding to the plurality of first outer lenses 24a of the first lens array plate 24 are formed in the first light shielding member 30a. A plurality of second through holes 30e corresponding to the plurality of second outer lenses 26a of the second lens array plate 26 are formed in the second light shielding member 30b. The first through holes 30d and the second through holes 30e are cylindrical through holes.

The first through holes 30d and the second through holes 30e according to the embodiment have the same shape and are arranged in a line at the same pitch in the longitudinal direction of the first light shielding member 30a and the second light shielding member 30b, respectively. The central axes of the two corresponding through holes are aligned. The diameter of each of the first through holes 30d and the second through holes 30e is substantially the same as the diameter of the effective region of each of the first outer lenses 24a, the first inner lenses 24b, the second outer lenses 26a, and the second inner lenses 26b. The term "effective region of a lens" refers to a portion having the function of a lens. The pitch of arrangement of the first through holes 30d and the second through holes 30e is identical to the pitch of arrangement of the first outer lenses 24a, the first inner lenses 24b, the second outer lenses 26a, and the second inner lenses 26b.

The first light shielding member 30a, the second light shielding member 30b, and the support part 30c are integrally formed by a light shielding material. The members and the support part may be formed by injection molding. Preferably, the light shielding material is amenable to injection molding and is highly capable of shielding light in a required wavelength band. For example, the light shielding material may be a black ABS resin.

According to the embodiment, the first lens array plate 24 and the second lens array plate 26 are held by the holder 30 by being inserted into the space between the first light shielding member 30a and the second light shielding member 30b from the open right end side in the lateral direction.

In a state where the first lens array plate 24 is inserted into the holder 30, each of the plurality of first outer lenses 24a is directly opposite to the corresponding first through hole 30d of the first light shielding member 30a. In a state where the second lens array plate 26 is inserted into the holder 30, each of the plurality of second outer lenses 26a is directly opposite to the corresponding second through hole 30e of the second light shielding member 30b. The location of the lens directly opposite to the through hole is defined as a location where the light axis of the lens is substantially aligned with the central axis of the through hole.

By producing the assembly as described above, the area on the first outer side surface 24c of the first lens array plate 24 outside the effective region of the first outer lenses 24a is covered by the first light shielding member 30a. Further, the area on the second outer side surface 26c of the second lens array plate 26 outside the effective region of the second outer lenses 26a is covered by the second light shielding member 30b. Due to the first light shielding member 30a and second light shielding member 30b, stray light diagonally incident on the erecting equal-magnification lens array plate 10 and producing ghost can be removed so that high-quality erect equal-magnification images with reduced ghost can be formed.

In this embodiment, a light shielding wall 40 for shielding light reflected by the document table 14 is provided upright on a top surface 30f of the first light shielding member 30a of the erecting equal-magnification lens array plate 10. The top surface 30f of the first light shielding member 30a faces the document table 14 when the erecting equal-magnification lens array plate 10 is built in the image reading device 100. The light shielding wall 40 is provided upright at a region 30g in the top surface 30f of the first light shielding member 30a to the right of the first through hole 30d. The region 30g is located more toward the line light source 16 than the first through hole 30d when the erecting equal-magnification lens array plate 10 is built in the image reading device 100. As shown in FIG. 2, the light shielding wall 40 is formed as a straight light shielding wall extending parallel to the main scanning direction.

The erecting equal-magnification lens array plate 10 formed as described above is located adjacent to the line light source 16 so that the light shielding wall 40 is located between the first through hole 30d and the line light source 16, as shown in FIG. 1. When the erecting equal-magnification lens array plate 10 is built in the image reading device 100, the first outer side surface 24c of the first lens array plate 24 is opposite to the document table 14 and the second outer side surface 26c of the second lens array plate 26 is opposite to the line image sensor 20. It should be noted that the top surface 30f of the first light shielding member 30a of the erecting equal-magnification lens array plate 10 is located above a light emitting surface 16a of the line light source 16 (more toward the document table 14).

Figure 4:
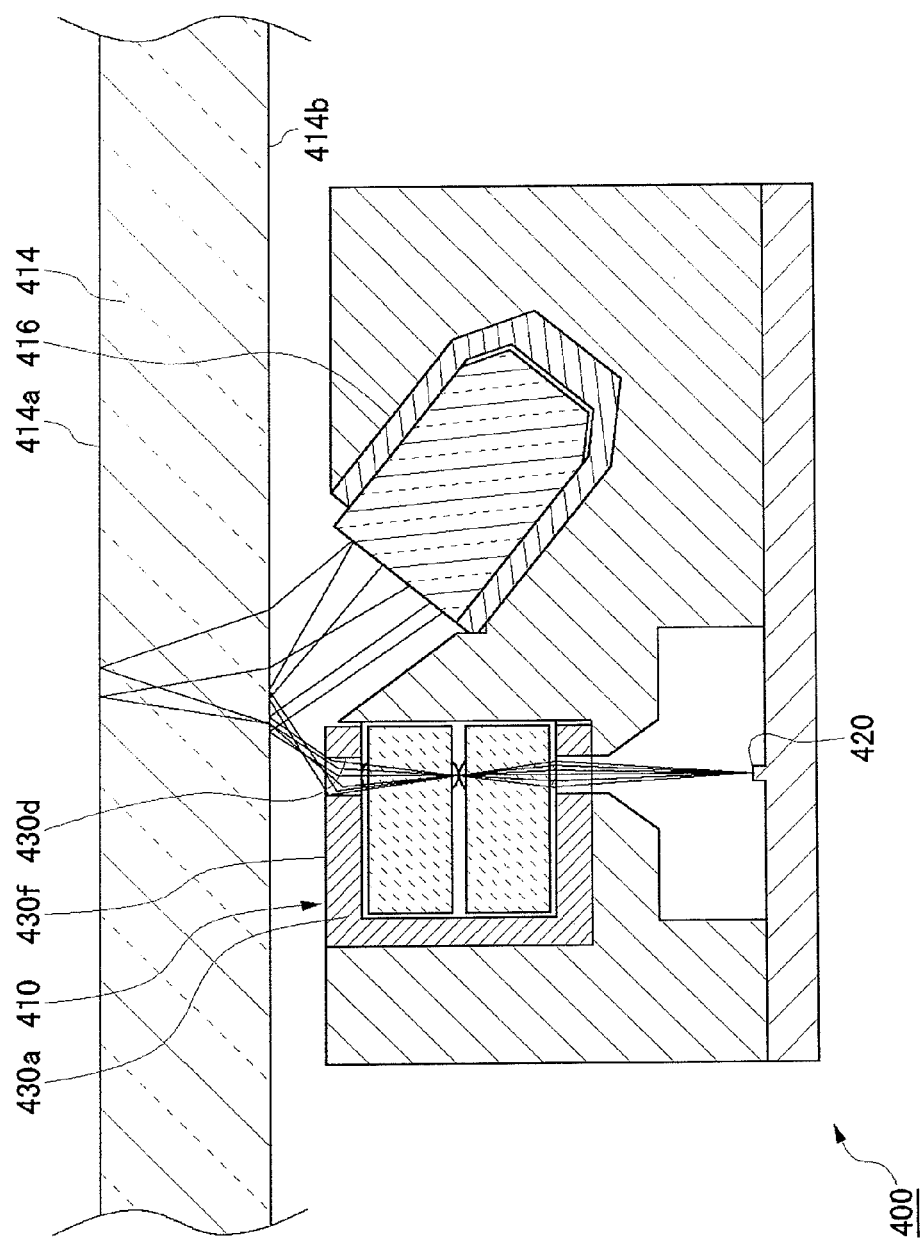
FIG. 4 shows how noise is produced in an image reading device according to a comparative example.

A description will now be given of noise elimination in the image reading device 100 according to the embodiment. Before describing the operation of the image reading device 100 according to the embodiment, a comparative example will be shown. FIG. 4 shows how noise is produced in an image reading device 400 according to the comparative example. In the image reading device 400 according to the comparative example, a light shielding wall is not formed on a top surface 430f of a first light shielding member 430a of an erecting equal-magnification lens array plate 410. The other aspects of the image reading device 400 are the same as the corresponding aspects of the image reading device 100 shown in FIG. 1.

FIG. 4 shows light beams exiting the line light source 416 and reflected by a top surface 414a or a bottom surface 414b of the document table 414. A majority of the beams exiting the line light source 416 are transmitted through the document table 414 and incident on the document, but there are some light beams reflected by the top surface 414a or the bottom surface 414b of the document table 414 due to Fresnel reflection. Much of the reflected light is shielded by the first light shielding member 430a of the erecting equal-magnification lens array plate 410, but a small portion of the light enters the lens via the first through hole 430d, reaching a line image sensor 420.

The light reflected by the top surface 414a or the bottom surface 414b of the document table 414 and reaching the line image sensor 420 is relatively less intense and hardly shows in the image formed on the image plane if the document is white. If the document is in black or the document is not placed, however, the light shows as noise of a nonnegligible level in the image. In particular, the light shows in the image as periodically bright and dark linear noise that depends on the periodical arrangement of the lenses of the erecting equal-magnification lens array plate 410 and so is highly visible, with the result that the image quality may be lowered. The light that causes bright and dark light linear noise is incident from the direction of the document table and is difficult to eliminate merely by providing the first light shielding member 30a.

Figure 5:
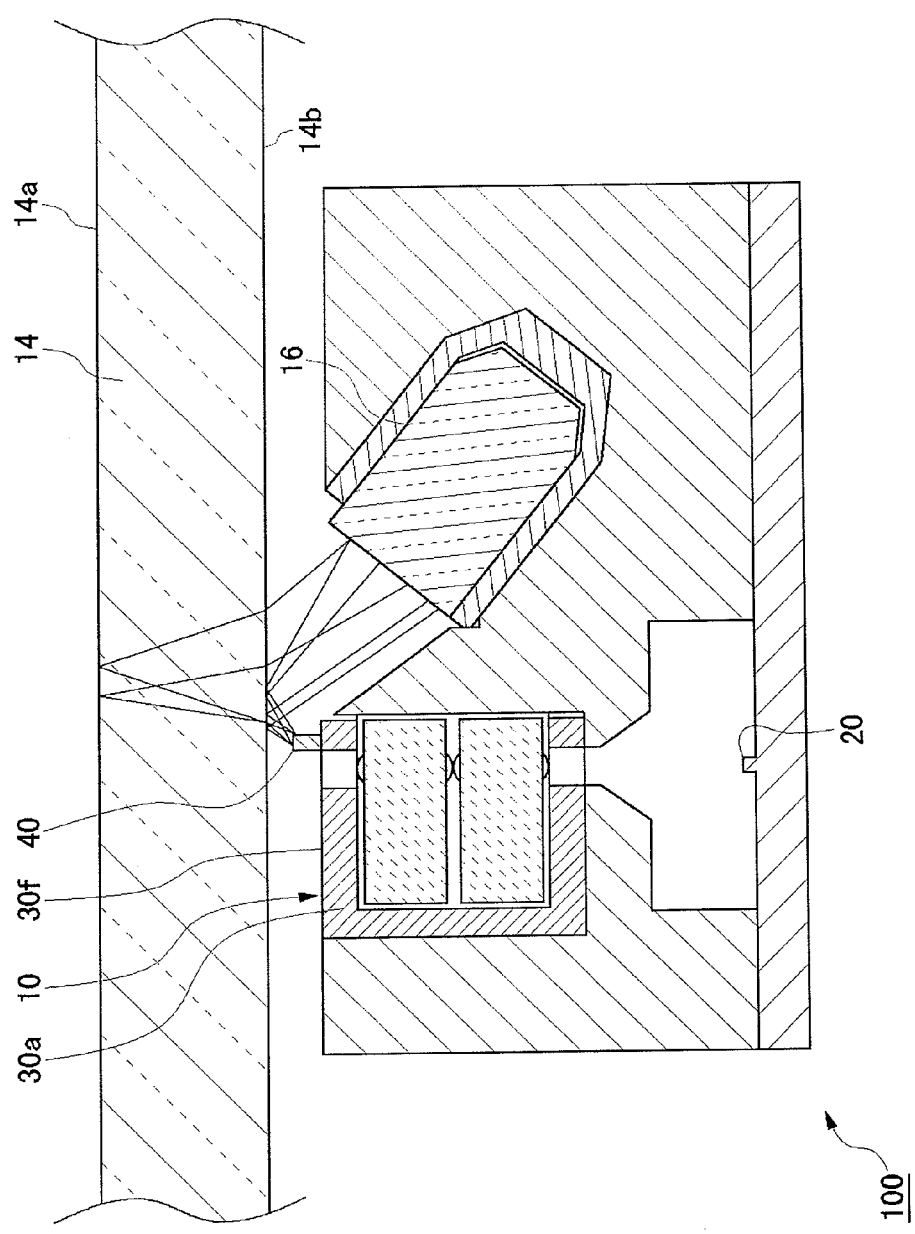
FIG. 5 shows how bright and dark linear noise is eliminated in the image reading device according to the embodiment.

FIG. 5 shows how bright and dark linear noise is eliminated in the image reading device 100 according to the embodiment. According to the embodiment, the light shielding wall 40 provided upright on the top surface 30f of the first light shielding member 30a shields the light reflected by the top surface 14a or the bottom surface 14b of the document table 14, as shown in FIG. 5. As a result, the light reflected by the top surface 14a or the bottom surface 14b of the document table 14 and reaching the line image sensor 20 is blocked so that bright and dark linear noise can be reduced.

In further accordance with the embodiment, the erecting equal-magnification lens array plate 10 and the line light source 16 are arranged such that the top surface 30f of the first light shielding member 30a is located above the light emitting surface 16a of the line light source 16 (more toward the document table 14), as described above. With this arrangement, the light exiting the line light source 16 is prevented from directly entering the lenses of the erecting equal-magnification lens array plate 10 so that flare noise is reduced.

As described above, according to the image reading device 100 of the embodiment, a high-quality image can be obtained in which not only ghost noise or flare noise is reduced but also bright and dark linear noise that becomes visible in the presence of a black-colored document or in the absence of a document on the document table is reduced.

In this embodiment, a straight light shielding wall extending parallel to the main scanning direction is formed, as shown in FIG. 2. However, the light-shielding wall should only extend across the diameter of each of the first through holes 30d and so may not necessarily be continuous as described in the embodiment. Provision of the continuous light-shielding wall as in the embodiment is favorable because it shields light entering past a portion between the lenses properly.

Figure 6:
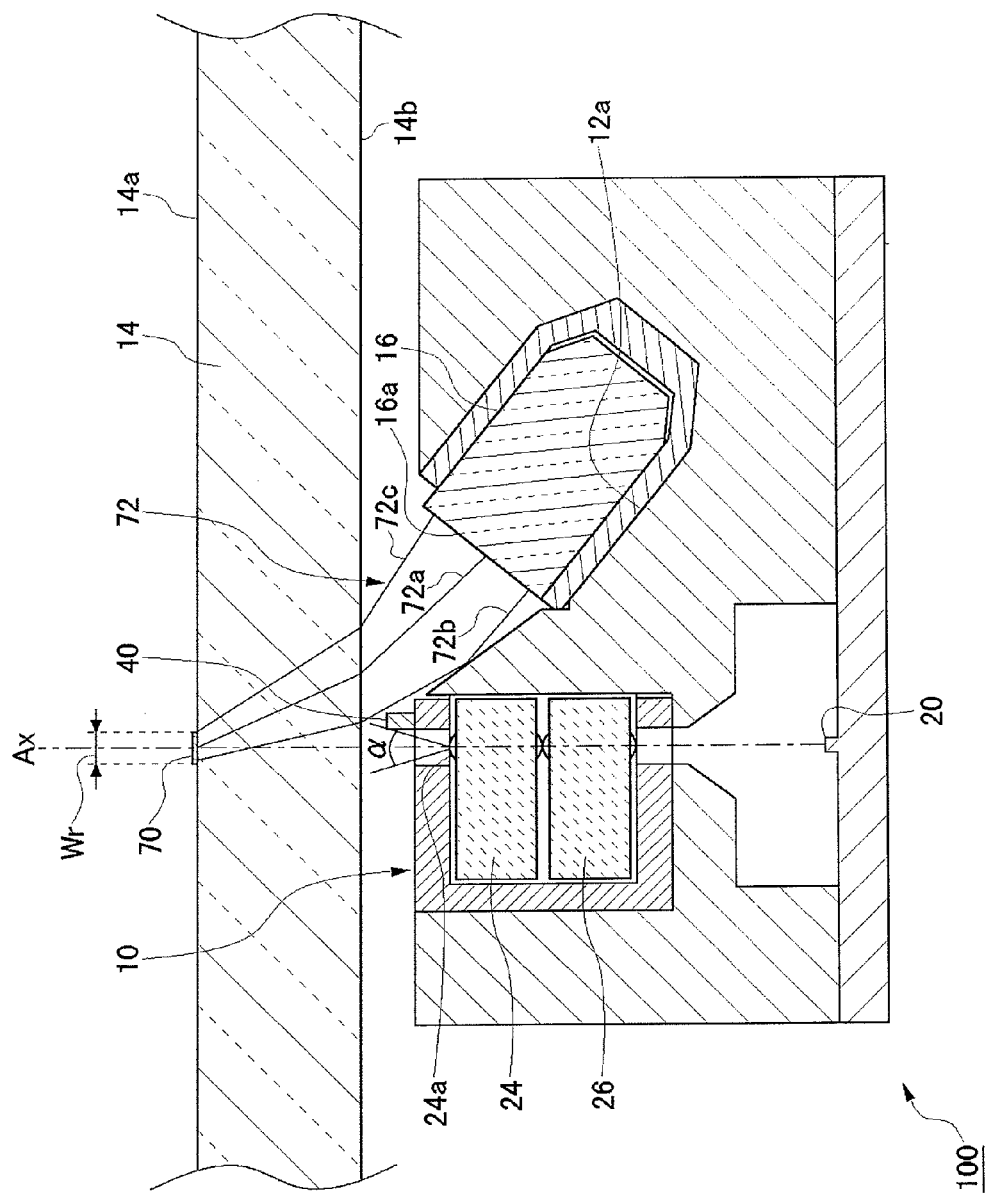
FIG. 6 shows the light-shielding wall.

FIG. 6 shows the light-shielding wall 40. FIG. 6 shows an angle of view a of the first outer lens 24a of the first lens array plate 24. FIG. 6 also shows light paths 72a-72c of light 72 exiting the light emitting surface 16a of the line light source 16 and reaching an image reading portion 70 on the top surface 14a of the document table 14.

The image reading portion 70 is a portion on the top surface 14a of the document table 14 actually read by the line image sensor 20 at a point of time while the document is being scanned and read. The image reading portion 70 is a linear portion centered around the intersection of the vertical center plane of the lens optics (plane including the light axis Ax) and the top surface 14a of the document table 14, and having a predetermined width Wr in the sub-scanning direction. For example, provided that the line image sensor 20 as used comprises three line image sensors for RGB components arranged in a row in the sub-scanning direction, each individual sensor having a width of 50 μm, and provided that the tolerance of the assembly is ±25 μm, the width Wr may be defined as 50 μm×3+25×2=200 μm.

FIG. 6 shows the light path 72a reaching the center of the width of the image reading portion 70 and the light paths 72b and 72c reaching the respective ends of the image reading portion 70 in the sub-scanning direction. The light path 72b is closer to the erecting equal-magnification lens array plate 10 and is a path of the light reflected by the wall of the first recess 12a before reaching the image reading portion 70.

As shown in FIG. 6, the light-shielding wall 40 is desirably formed outside the angle of view a of the first outer lens 24a of the first lens array plate 24 and outside the light path of the light 72 reaching the image reading portion 70 from the line light source 16.

If the light-shielding wall 40 is provided inside the angle of view a of the first outer lens 24a or inside a space defined by the light path of the light 72 reaching the image reading portion 70 from the line light source 16, the wall will block light that contributes to imaging with the result that the amount of light may be reduced and the image resolution may be lowered. However, by forming the light-shielding wall 40 outside the angle of view a of the first outer lens 24a of the first lens array plate 24 and outside the light path of the light 72 reaching the image reading portion 70 from the line light source 16, light reflected from the document table 14 can be blocked without shielding light that contributes to imaging. By forming the light-shielding wall 40 with the maximum height within the constraints described above, light reflected from the document table 14 can be most effectively shielded.

Figure 7:
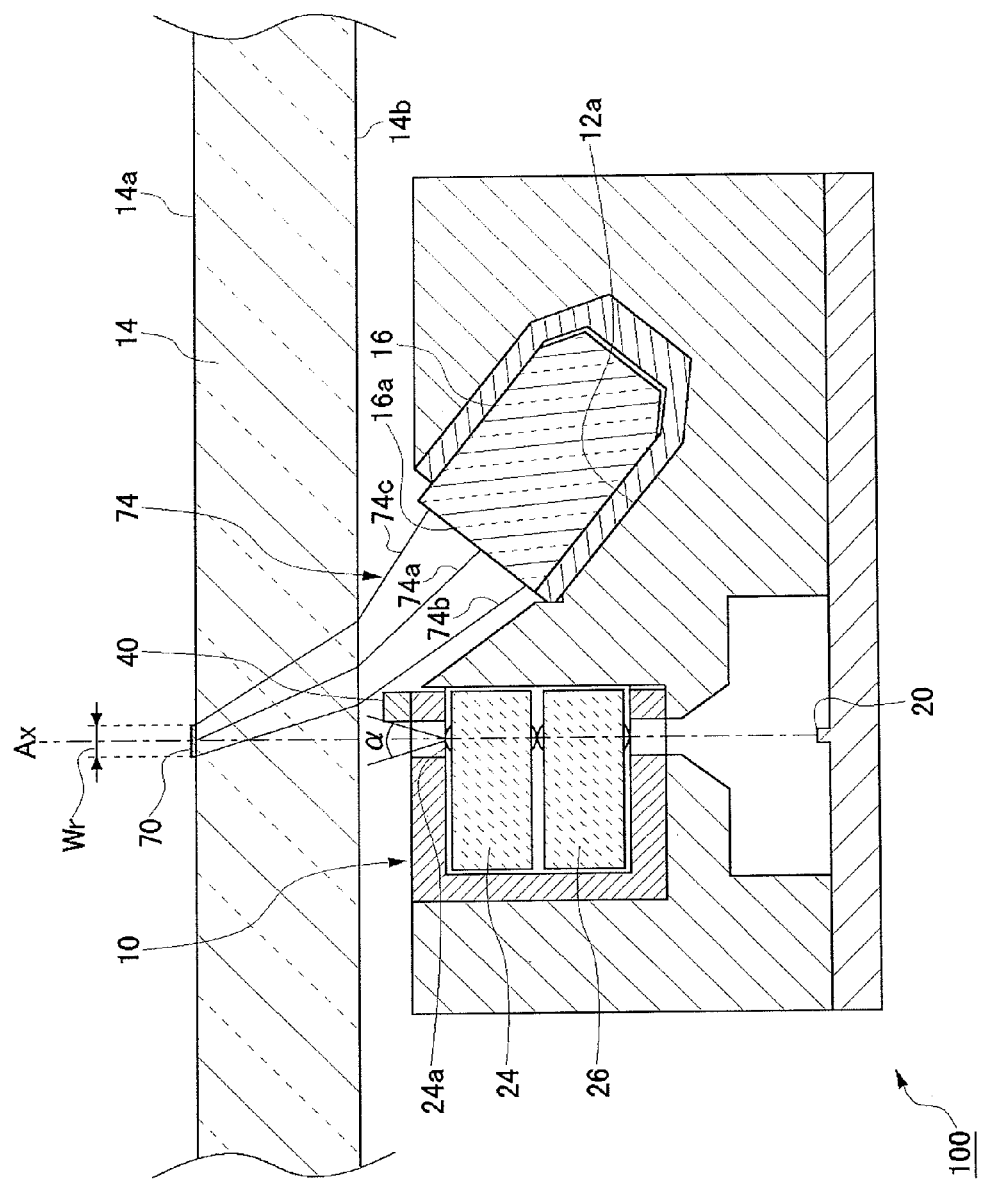
FIG. 7 shows the light-shielding wall.

FIG. 7 also shows the light-shielding wall 40. FIG. 7 also shows light paths 74a-74c of light 74 exiting the light emitting surface 16a of the line light source 16 and directly reaching an image reading portion 70. FIG. 7 shows the light path 74a reaching the center of the width of the image reading portion 70 and the light paths 74b and 74c reaching the respective ends of the image reading portion 70 in the sub-scanning direction. The light path 74b is closer to the erecting equal-magnification lens array plate 10 and is a path of the light directly reaching the image reading portion 70 without being reflected by, for example, the wall of the first recess 12a.

As shown in FIG. 7, the light-shielding wall 40 may be formed outside the angle of view a of the first outer lens 24a of the first lens array plate 24 and outside the light path of the light 74 directly reaching the image reading portion 70 from the line light source 16. The above-described formation is equally useful to shield light reflected from the document table 14 without shielding light that contributes to imaging. By forming the light-shielding wall 40 with the maximum height within the constraints described above, light reflected from the document table 14 can be effectively shielded.

Figure 8:
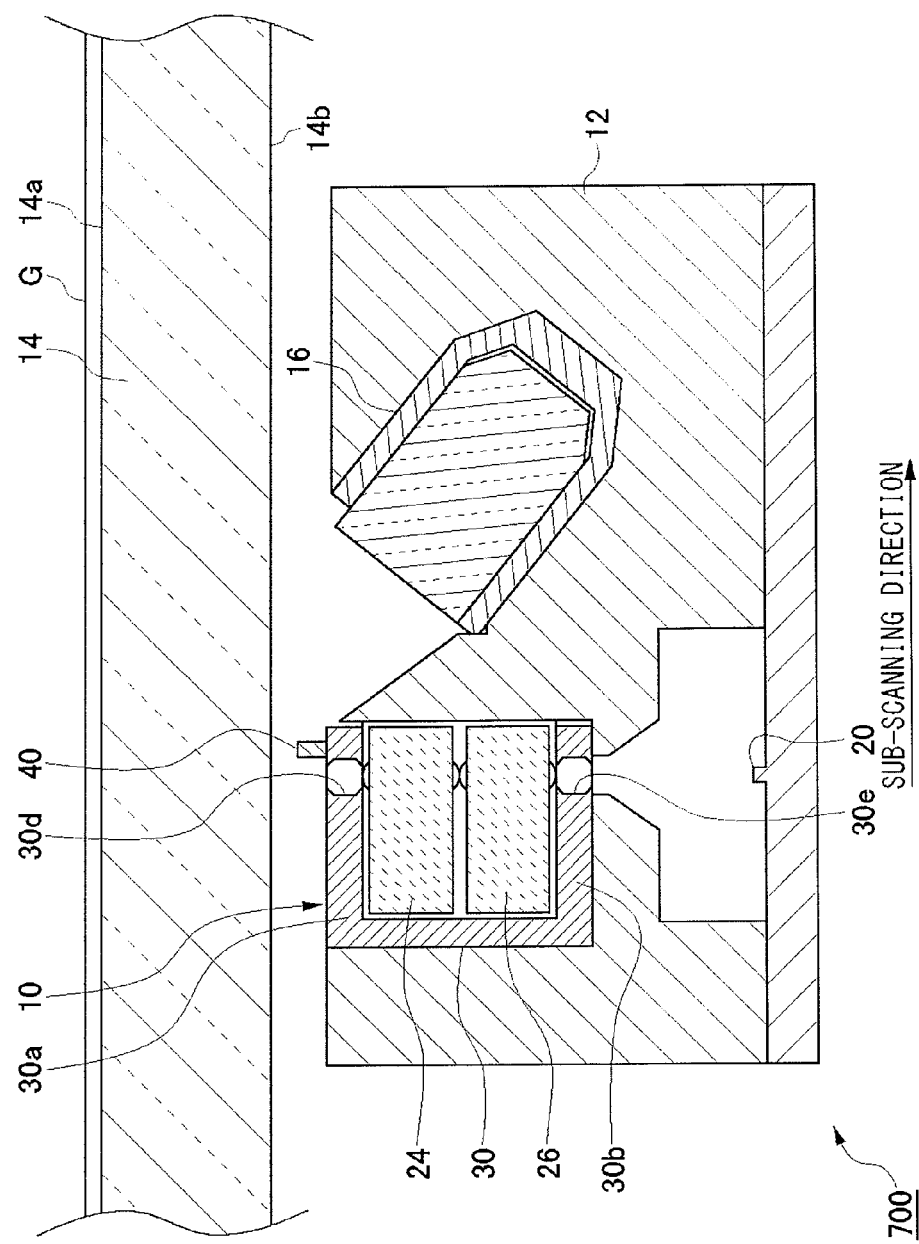
FIG. 8 shows a cross section of an image reading device according to another embodiment of the present invention.

FIG. 8 shows a cross section of an image reading device 700 according to another embodiment of the present invention. The image reading device 700 is designed to suitably eliminate flare noise produced by light reflected by the lateral wall of the through hole of the light-shielding member.

The components of the image reading device 700 identical to or similar to those of the image reading device 100 shown in FIG. 1 are represented by like numerals and a detailed description is omitted. The image reading device 700 is configured such that the shape of the first through hole 30d of the first light-shielding member 30a and the shape of the second through hole 30e of the second light-shielding member 30b are different from the corresponding shapes in the image reading device 100 shown in FIG. 1.

Figure 9:
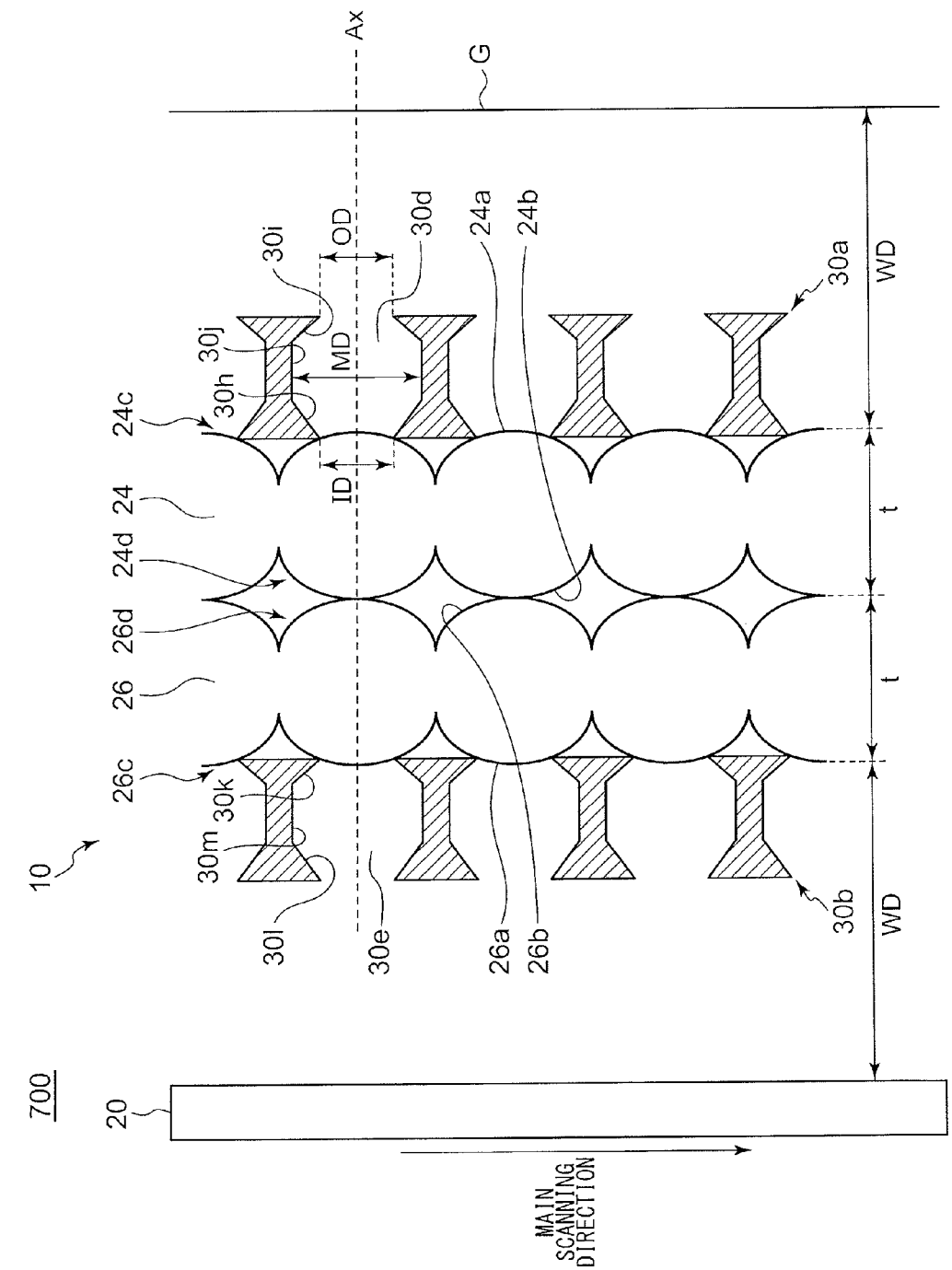
FIG. 9 shows a cross section of the image reading device in the main scanning direction.

FIG. 9 shows a cross section of the image reading device 700 in the main scanning direction. Referring to FIG. 9, the vertical direction in the illustration represents the main scanning direction and the depth direction in the illustration represents the sub-scanning direction. In FIG. 9 and the subsequent figures, illustration of the document table 14 is omitted.

As shown in FIG. 9, each first through hole 30d of the first light-shielding member 30a according to this embodiment is provided with a cylindrical lateral wall portion 30j provided upright so as to surround a space above the first outer lens 24a, an annular inner projection portion 30h provided at the end of the lateral wall portion 30j facing the first outer lens 24a, and an annular outer projection portion 30i provided at the end of the lateral wall portion 30j facing the document G. The inner projection portion 30h and the outer projection portion 30i are provided so as to project from the inner circumferential edge of the lateral wall portion 30j toward the center of the hole.

As shown in FIG. 9, an opening having an opening diameter ID (hereinafter, inner opening diameter ID) is formed inside the inner projection portion 30h, and an opening having an opening diameter OD (hereinafter, referred to as outer opening diameter OD) is formed inside the outer projection portion 30i. In this embodiment, the inner projection portion 30h and the outer projection portion 30i are formed such that the portions have the identical height. Therefore, given that the inner diameter of the lateral wall portion 30j is denoted by MD, the inner opening diameter ID=the outer opening diameter OD<the inner diameter MD. FIG. 9 shows that the inner projection portion 30h is in contact with the first outer lens 24a but they may be spaced apart.

The inner projection portion 30h and the outer projection portion 30i are formed such that there are no surfaces parallel to the light axis Ax of the lens system.

As shown in FIG. 9, the inner projection portion 30h according to this embodiment is tapered such that the inner diameter is progressively larger from the edge facing the first outer lens 24a toward the center of the first through hole 30d in the direction of height. The outer projection portion 30i is tapered such that the inner diameter is progressively larger from the end facing the document G toward the center of the first through hole 30d in the direction of height.

As in the first light-shielding wall 30a, each second through hole 30e of the second light-shielding wall 30b is provided with a cylindrical lateral wall portion 30m provided upright so as to surround a space above the second outer lens 26a, an annular inner projection portion 30k provided at the end of the lateral wall portion 30m facing the second outer lens 26a, and an outer projection portion 30l provided at the end of the lateral wall portion 30m facing the line image sensor 20. The inner projection portion 30k and the outer projection portion 30l are provided so as to project from the inner circumferential edge of the lateral wall portion 30m toward the center of the hole. The shapes of the lateral wall portion 30m, the inner projection portion 30k, and the outer projection portion 30l of the second through hole 30e are identical to those of the first through hole 30d so that a detailed description is omitted. FIG. 9 shows that the inner projection portion 30k is in contact with the second outer lens 26a but they may be spaced apart.

The erecting equal-magnification lens array plate 10 as configured above is built in the image reading device 700 such that the distance from the first outer lens 24a to the document G and the distance from the second outer lens 26a to the line image sensor 20 are equal to a predetermined working distance WD.

Figure 10:
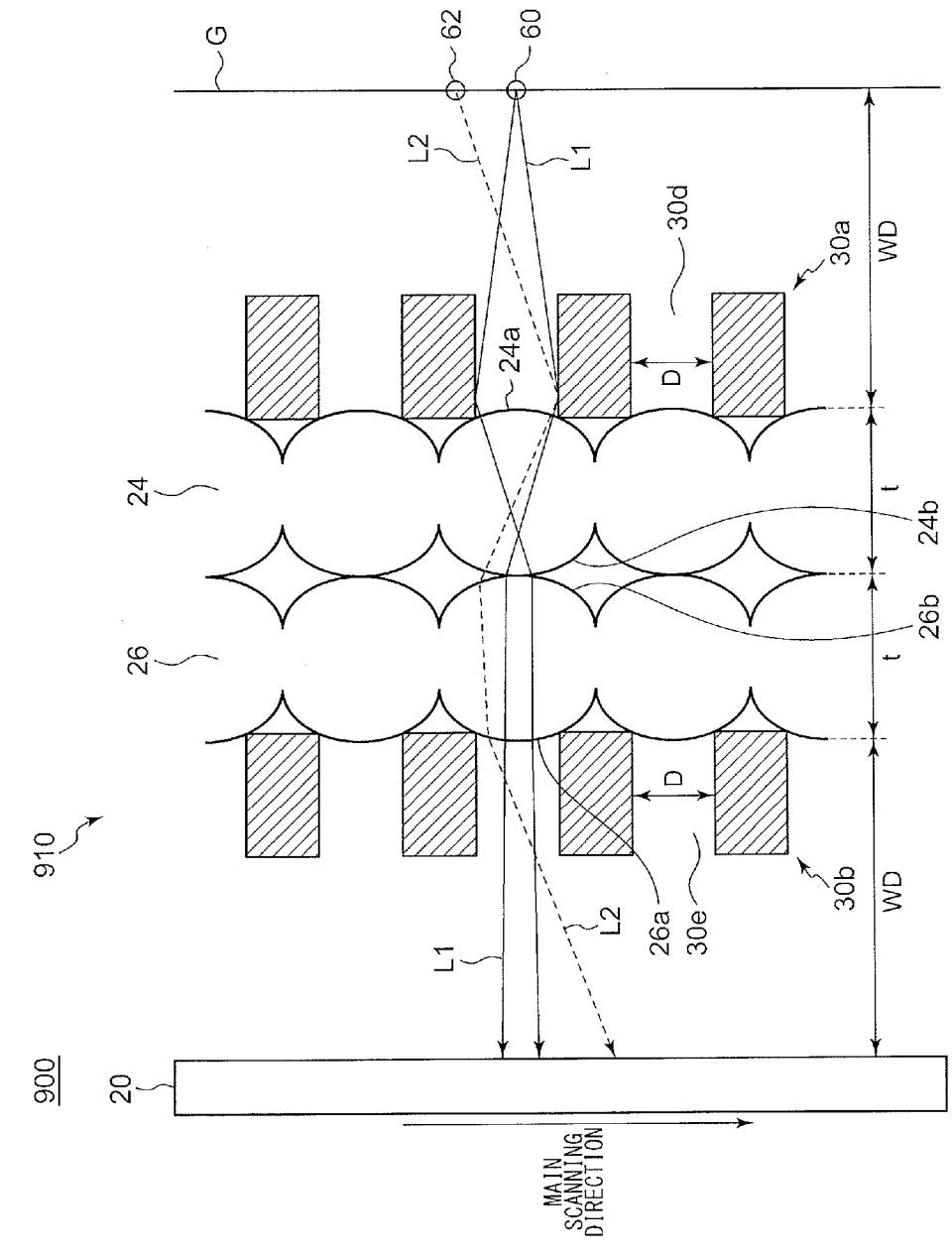
FIG. 10 shows how flare noise is produced in an image reading device according to a comparative example.

A description will now be given of flare noise elimination in the image reading device 700 according to the embodiment. Before describing the operation of the image reading device 700 according to the embodiment, a comparative example will be shown. FIG. 10 shows how flare noise is produced in an image reading device 900 according to the comparative example. In the image reading device 900 according to the comparative example, the first through holes 30d of the first light-shielding member 30a and the second through holes 30e of the second light-shielding member 30b are simply cylindrically formed. Inner projection portions or outer projection portions are not formed. In other words, the inner diameter D of the first through holes 30d and the second through holes 30e in the image reading device 900 remains constant in the direction of height of the through holes.

First, a beam L1 (solid line) emitted from a point 60 on the document G located on the light axis of the first outer lens 24a will be discussed. Normally, the beam L1 about to be incident on the first lens array plate 24 at an angle of incidence larger than the imaging light is absorbed by the lateral wall of the first through hole 30d of the first light shielding member 30a. However, the beam L1 is not completely absorbed even if a light absorbing material is used. The beam L1 is partly incident on the first outer lens 24a due to Fresnel reflection. This is because, the Fresnel reflection coefficient for an angle of incidence as large as 90° of the beam L1 incident on the lateral wall of the first through hole 30d is extremely large.

As shown in FIG. 10, the reflected beam L1 is transmitted through the first outer lens 24a, the first inner lens 24b, the second inner lens 26b, and the second outer lens 26a before being incident on the line image sensor 20, causing flare noise. Hereinafter, the term "angle of incidence" is intended to mean an angle of incidence on the erecting equal-magnification lens array plate unless otherwise specified.

Secondly, a beam L2 (broken line) emitted from a point 62 on the document G outside the light axis of the first outer lens 24a will be discussed. The beam L2 is partly reflected by the lateral wall of the first through hole 30d by Fresnel reflection. As shown in FIG. 10, the reflected beam L2 is transmitted through the first outer lens 24a, the first inner lens 24b, the second inner lens 26b, and the second outer lens 26a before being incident on the line image sensor 20, causing flare noise.

Flare noise produced by the reflection by the first light shielding member 30a is described with reference to FIG. 10. Flare noise is also produced by the reflection by the second light shielding member 30b.

Figure 11:
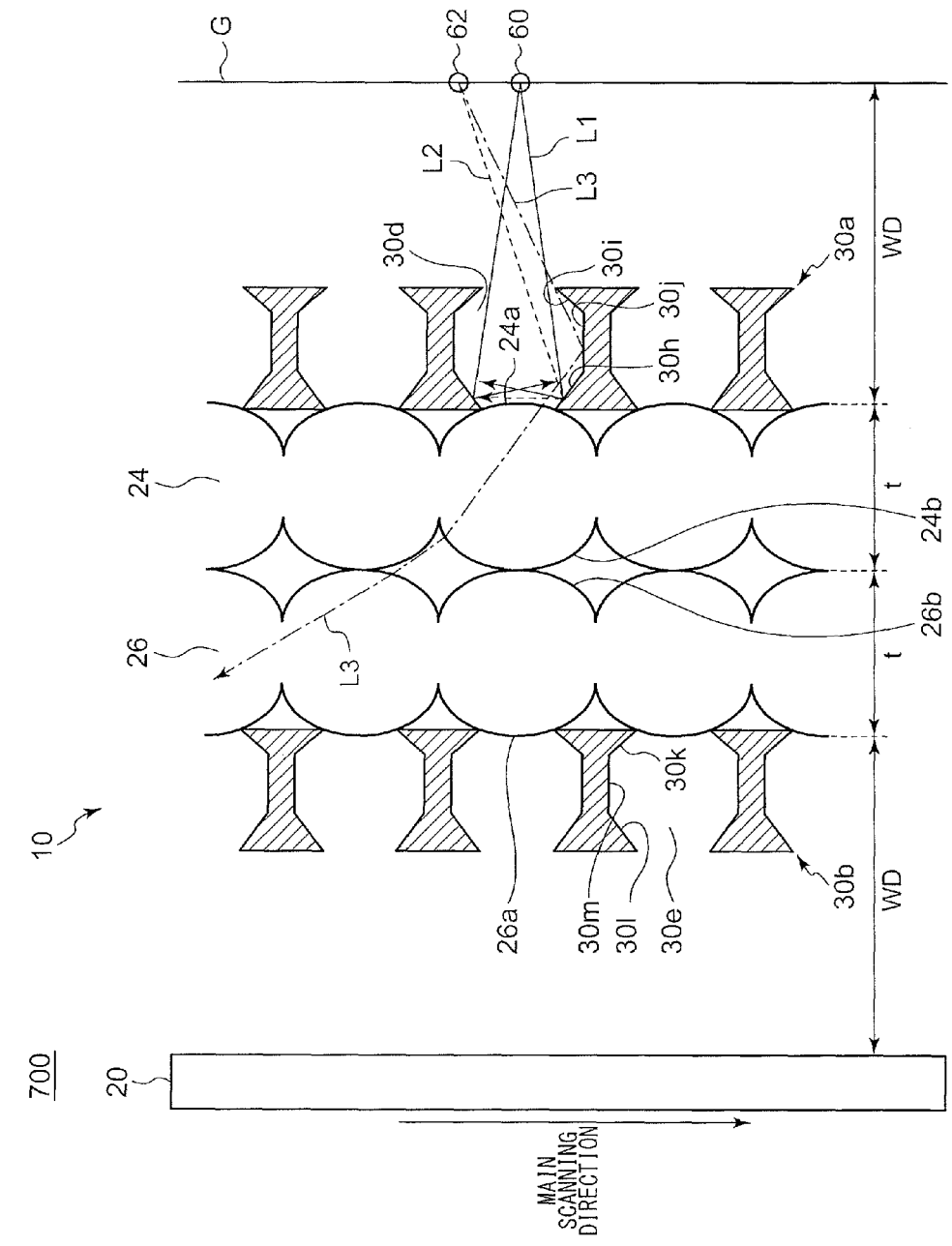
FIG. 11 shows flare noise elimination in the image reading device according to the embodiment.

FIG. 11 shows flare noise elimination in the image reading device 700 according to the embodiment. First, as in the case of the comparative example of FIG. 10, the beam (solid line) emitted from the point 60 on the document G located on the light axis of the first outer lens 24a will be discussed. In this embodiment, the beam L1 is incident on the inner projection portion 30h of the first through hole 30d. Since the interior surface of the inner projection portion 30h is formed as a tapered surface inclined with respect to the light axis, the beam L1 reflected by the inner projection portion 30h is reflected multiple times in the first through hole 30d without being incident on the first outer lens 24a. Since the angle of incidence on the tapered surface of the inner projection portion 30h is comparatively smaller than the angle in the comparative example, the Fresnel reflection coefficient will be small so that the beam L1 is considerably attenuated. Therefore, the beam L1 does not reach the line image sensor 20 so that flare noise due to the beam L1 is not produced. The same discussion applies to the beam L2 (broken line) emitted from the point 62 outside the light axis.

A beam L3 (chain line) having an angle of incidence larger than that of the beam L2 incident on the lateral wall portion 30j of the first through hole 30d after being emitted from the point 62 on the document G will be discussed. The beam L3 does not impinge upon the inner projection portion 30h due to the large angle of incidence and is incident on the first outer lens 24a. However, since the beam L3 is greatly inclined with respect to the optical axis, the beam does impinges upon the second light-shielding member 30b and does not reach the line image sensor 20. Therefore, flare noise is not produced by the beam L3.

The action of reducing flare noise by the inner projection portion 30h of the first through hole 30d, etc. is described with reference to FIG. 11. Flare noise is similarly reduced by the inner projection portion 30k of the second through hole 30e, etc.

As described above, according to the image reading device 700 of the embodiment, a high-quality image in which flare noise is reduced can be obtained.

When the outer projection portion 30i, etc. is formed in the first through hole 30d, the likelihood that bright and dark linear noise is produced due to light reflected from the top surface 14a or 14b of the document table 14 may be increased. The larger the angle of incidence on the top surface 14a or the bottom surface 14b of the document table 14, the higher the reflection coefficient of the top surface 14a or the bottom surface 14b. A large angle of incidence of light on the top surface 14a or the bottom surface 14b of the document table 14 translates into a small angle of incidence on the lateral wall of the first through hole 30d of the first light shielding member 30a. Therefore, the reflection coefficient of the lateral wall of the first through hole 30d having the shape of the comparative example will be small. However, if the outer projection portion 30i is provided in the first through hole 30d as in the embodiment, the angle of incidence on the outer projection portion 30i will be large so that the reflection coefficient of the lateral wall will be high. As a result, bright and dark linear noise may be increased as compared to the image reading device 900 according to the comparative example.

This is addressed by providing, as shown in FIG. 8, the light-shielding wall 40 for shielding light reflected by the top surface 14a or the bottom surface 14b of the document table 14, on the top surface 30f of the first light-shielding member 30a so as to reduce bright and dark linear noise. The shape and position of the light shielding wall 40 is the same as those of the image reading device 100 shown in FIG. 1.

As described above, the image reading device 700 according to the embodiment is configured such that the inner projection portion and the outer projection portion are formed in the first through hole 30d of the first light shielding member 30a and in the second through hole 30e of the second light-shielding member 30b, respectively, and that the light-shielding wall 40 is formed on the first light shielding member 30a. As such, the image reading device is capable of reducing flare noise more effectively, while reducing bright and dark linear noise.

Figure 12:
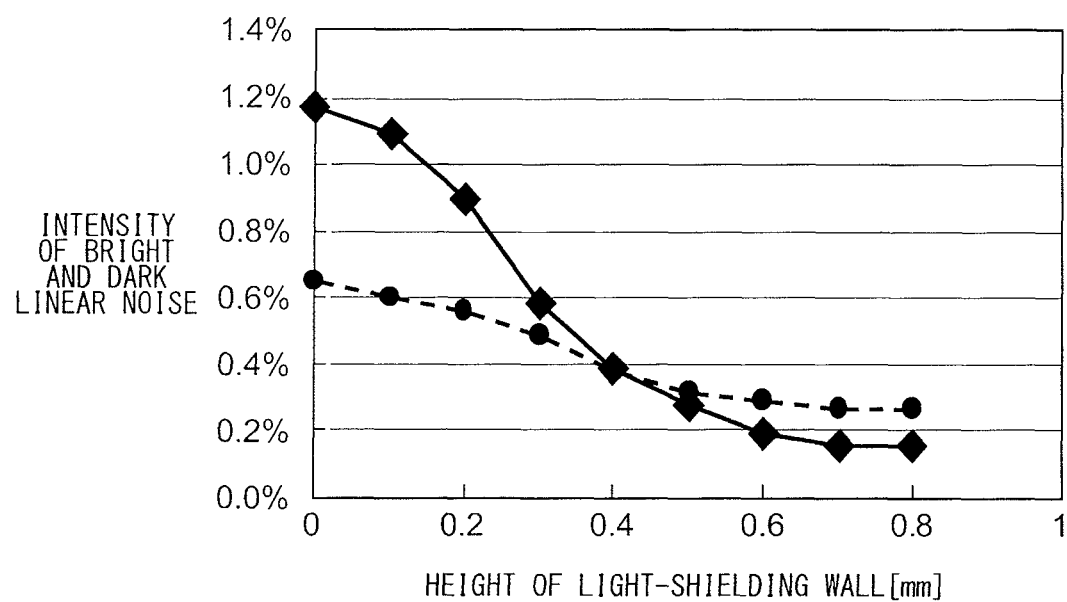
FIG. 12 shows how the intensity of bright and dark linear noise varies as the height of the light-shielding wall is varied.

FIG. 12 shows how the intensity of bright and dark linear noise varies as the height of the light-shielding wall 40 is varied. Referring to FIG. 12, the horizontal axis represents the height (mm) of the light-shielding wall 40 and the vertical axis represents the intensity of bright and dark linear noise given that the intensity of light in the presence of a white document represents 100%. As shown in FIG. 12, a simulation was conducted on two models of image reading devices, i.e., the image reading device 100 shown in FIG. 1 and the image reading device 700 shown in FIG. 8. Referring to FIG. 12, the broken line indicates the characteristic of the image reading device 100 shown in FIG. 1 and the solid line indicates the characteristic of image reading device 700 shown in FIG. 8.

The conditions of simulation are the same for the image reading devices 100 and 700. Namely, the conditions are such that the lens array comprises a single line, the lens's working distance=3.3 mm, the plate thickness of the first and second lens array plates=1.6 mm, the lens pitch=0.65 mm, the lens diameter D=0.65 mm, the refractive index n=1.53, the height of the first and second light shielding members=0.66 mm. Furthermore, the image reading device 700 is configured such that the inner opening diameter ID=0.47 mm, the outer opening diameter OD=0.47 mm, the inner diameter MD of the lateral wall portion is such that MD=0.6 mm, the angle of inclination of the tapered surface of the inner projection portion=45°, and the angle of inclination of the outer projection portion=45°.

Referring to FIG. 12, the height 0 mm of the light-shielding wall 40 indicates a status where the light-shielding wall is not formed. FIG. 12 teaches that the higher the light-shielding wall 40 in the image reading devices 100 and 700, the lower the intensity of bright and dark linear noise. As described above, the intensity of bright and dark linear noise in the image reading device 700 is more higher than that of the image reading device 100 when the height of the light-shielding wall 40 is small, due to the outer projection portion 30i provided in the first through hole 30d. In both of the image reading devices 100 and 700, bright and dark linear noise decreases below 0.4% in intensity and becomes hardly visible when the height of the light-shielding wall 40 is 0.4 mm or larger. Bright and dark linear noise decreases more in intensity in the image reading device 700 than in the image reading device 100 when the height of the light-shielding wall 40 is 0.4 mm or larger. The figure teaches that the intensity of bright and dark linear noise does not vary much when the height of the light-shielding wall 40 is 0.7 mm or larger.

Figure 13:
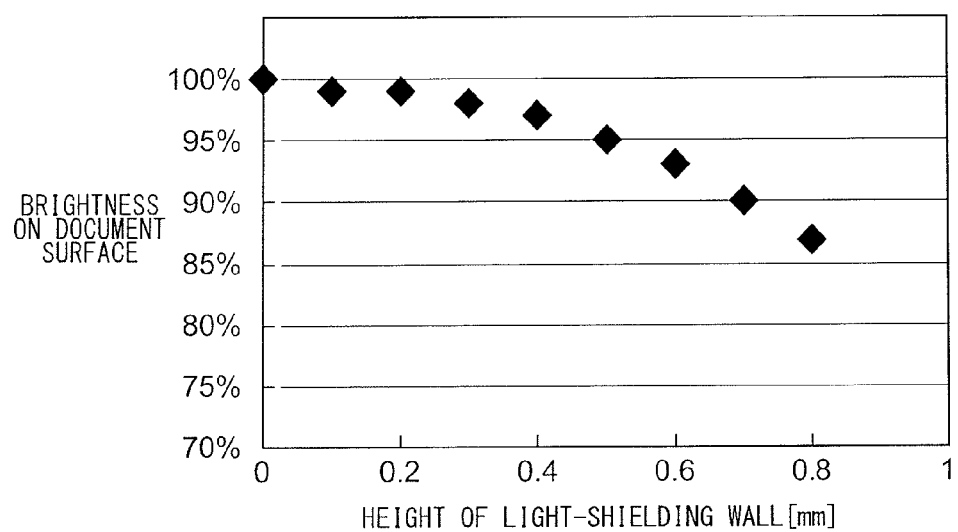
FIG. 13 shows how the brightness on the document surface varies as the height of the light-shielding wall is varied.

FIG. 13 shows how the brightness on the document surface varies as the height of the light-shielding wall 40 is varied. Referring to FIG. 13, the horizontal axis represents the height (mm) of the light-shielding wall 40 and the vertical axis represents the brightness on the document surface given that the brightness of the document surface crossed by the lens light axis occurring when the light-shielding wall 40 is not formed represents 100%.

FIG. 13 teaches that the higher the light-shielding wall 40, the less bright the document surface. This is because the higher the light-shielding wall 40, the more of the light from the line light source 16 is shielded by the light-shielding wall 40. Therefore, it desirable to set the height of the light-shielding wall 40, by allowing not only for variation in the intensity of bright and dark linear noise shown in FIG. 12 but also variation in the brightness on the document surface shown in FIG. 13. Referring to FIGS. 12 and 13, the height of the light-shielding wall 40 of 0.4 mm should represent a setting that establishes balance elimination of bright and dark linear noise and brightness of the document surface since the intensity of bright and dark linear noise is 0.4% and the drop in the brightness of the document surface is about 3%. It is favorable to form the light-shielding wall 40 such that the brightness of the document surface drops 5% or less for the purpose of maintaining the image resolution.

Described above is an explanation based on an exemplary embodiment. The embodiment is intended to be illustrative only and it will be obvious to those skilled in the art that various modifications to constituting elements and processes could be developed and that such modifications are also within the scope of the present invention.

In the embodiment described, lenses on the respective lens surfaces are arranged in a single row in the main scanning direction. The arrangement of lenses is not limited to this, and lenses may be arranged in two rows in the main scanning direction or arranged in a square array.

What is claimed is:

1. An erecting equal-magnification lens array plate configured to receive light emitted by a line light source and reflected from a document placed on a document table, and form an erect equal-magnification image on a light receiving surface of a line image sensor,
wherein the equal-magnification lens array plate comprises:
a first lens array plate formed with a plurality of lenses on each of two surfaces thereof and arranged such that one of the surfaces is opposite to the document table;
a second lens array plate formed with a plurality of lenses on each of two surfaces thereof and arranged such that one of the surfaces is opposite to the first lens array plate and the other surface is opposite to the line image sensor;
a shielding member provided with a plurality of through holes corresponding to lenses formed on a surface of the first lens array plate and provided on said surface of the first lens array plate such that the through holes are located directly opposite to the corresponding lenses; and
a light-shielding wall provided upright on a surface of the light-shielding member facing the document table and configured to shield light reflected by the document table,
wherein the light-shielding wall is formed outside an angle of view of the lenses formed on a surface of the first lens array plate.

2. The erecting equal-magnification lens array plate according to claim 1,
wherein the light-shielding wall is provided upright on the surface of the light-shielding member facing the document table and at a region closer to the line light source than the through holes.

3. The erecting equal-magnification lens array plate according to claim 1,
wherein the light-shielding member is provided such that the surface thereof facing the document table is closer to the document table than a light emitting surface of the line light source.

4. The erecting equal-magnification lens array plate according to claim 1,
wherein the light-shielding wall is formed outside a light path of light reaching a predetermined image reading portion of the document table from the line light source.

5. An image reading device comprising:
a document table on which a document is placed;
a line light source configured to illuminate the document;
an erecting equal-magnification lens array plate configured to receive light reflected from the document and form an erect equal-magnification image on a predetermined image plane; and
a line image sensor configured to receive the erect equal-magnification image formed by the erecting equal-magnification lens array plate;
wherein the erecting equal-magnification lens array plate comprises:
a first lens array plate formed with a plurality of lenses on each of two surfaces thereof and arranged such that one of the surfaces is opposite to the document table;
a second lens array plate formed with a plurality of lenses on each of two surfaces thereof and arranged such that one of the surfaces is opposite to the first lens array plate and the other surface is opposite to the line image sensor;
a shielding member provided with a plurality of through holes corresponding to lenses formed on a surface of the first lens array plate and provided on said surface of the first lens array plate such that the through holes are located directly opposite to the corresponding lenses; and
a light-shielding wall provided upright on a surface of the light-shielding member facing the document table and configured to shield light reflected by the document table, wherein the light-shielding wall is formed outside an angle of view of the lenses formed on a surface of the first lens array plate.

6. The image reading device comprising according to claim 5, wherein the light-shielding wall is provided upright on the surface of the light-shielding member facing the document table and at a region closer to the line light source than the through holes.

7. The image reading device comprising according to claim 5, wherein the light-shielding member is provided such that the surface thereof facing the document table is closer to the document table than a light emitting surface of the line light source.

8. The image reading device comprising according to claim 5, wherein the light-shielding wall is formed outside a light path of light reaching a predetermined image reading portion of the document table from the line light source.

* * * * *